United States Patent
Vakil et al.

(10) Patent No.: US 8,385,937 B2
(45) Date of Patent: Feb. 26, 2013

(54) LOAD EQUALIZING ANTENNAS

(75) Inventors: Faramak Vakil, Bedminster, NJ (US);
David Famolari, Stewartsville, NJ (US);
Kamesh Medepalli, Sunnyvale, CA (US); Prathima Agrawal, New Providence, NJ (US); Toshikazu Kodama, Morristown, NJ (US); Shuichi Obayashi, Fort Lee, NJ (US); Ryoko Matsuo, Bridgewater, NJ (US)

(73) Assignees: Toshiba America Research Inc., Piscataway, NJ (US); Telcordia Inc., Piscataway, NJ (US)

( * ) Notice: Subject to any disclaimer, the term of this patent is extended or adjusted under 35 U.S.C. 154(b) by 0 days.

(21) Appl. No.: 10/885,238

(22) Filed: Jul. 7, 2004

(65) Prior Publication Data

US 2006/0009232 A1   Jan. 12, 2006

(51) Int. Cl.
*H04W 72/00*  (2009.01)
*H04M 1/00*  (2006.01)

(52) U.S. Cl. .......................... 455/453; 455/562

(58) Field of Classification Search .......... 455/450, 455/12.1, 414, 342, 67.1, 562, 562.1, 277.2, 455/435, 25, 466, 550, 414.2; 342/354, 373; 370/328, 335, 389, 334
See application file for complete search history.

(56) References Cited

U.S. PATENT DOCUMENTS

| | | | |
|---|---|---|---|
| 5,790,070 A * | 8/1998 | Natarajan et al. ............. 342/354 |
| 5,815,116 A * | 9/1998 | Dunbridge et al. ........... 342/373 |
| 5,936,577 A * | 8/1999 | Shoki et al. .................. 342/373 |
| 6,104,930 A * | 8/2000 | Ward et al. .................... 455/450 |
| 6,181,955 B1 * | 1/2001 | Dartois ....................... 455/562.1 |
| 6,229,486 B1 * | 5/2001 | Krile ...................... 343/700 MS |
| 6,236,849 B1 * | 5/2001 | Reudink et al. ............... 455/342 |
| 6,301,238 B1 * | 10/2001 | Hagerman et al. ........... 370/336 |
| 6,347,220 B1 * | 2/2002 | Tanaka et al. ............. 455/277.2 |
| 6,768,913 B1 * | 7/2004 | Molnar et al. ............. 455/562.1 |
| 6,804,521 B2 * | 10/2004 | Tong et al. .................... 455/450 |
| 6,937,863 B1 * | 8/2005 | Gordon et al. ................ 455/446 |
| 2002/0034967 A1 * | 3/2002 | Taniguchi et al. ............ 455/562 |
| 2002/0089956 A1 * | 7/2002 | Haugli et al. ................. 370/335 |
| 2002/0115474 A1 * | 8/2002 | Yoshino et al. ............... 455/562 |
| 2002/0146983 A1 * | 10/2002 | Scherzer et al. ............. 455/67.1 |
| 2003/0017853 A1 * | 1/2003 | Kanamaluru et al. ........ 455/562 |
| 2003/0032429 A1 * | 2/2003 | Macridis et al. .............. 455/435 |
| 2003/0050051 A1 * | 3/2003 | Vilander ....................... 455/414 |
| 2003/0118015 A1 * | 6/2003 | Gunnarsson et al. ......... 370/389 |
| 2003/0181163 A1 * | 9/2003 | Ofuji et al. ..................... 455/25 |
| 2004/0077379 A1 * | 4/2004 | Smith et al. ............... 455/562.1 |
| 2004/0095901 A1 * | 5/2004 | Rajkotia ....................... 370/328 |
| 2004/0233872 A1 * | 11/2004 | Lobinger et al. ............. 370/334 |
| 2005/0197060 A1 * | 9/2005 | Hedinger et al. ............ 455/12.1 |

OTHER PUBLICATIONS

J. Rosenberg et al., "SIP:Session Initiation Protocol", pp. 1-240, dated Jun. 2002.
Tsern-Huei Lee et al., "Design of a Real-Time Call Admission Controller for ATM Networks", IEEE/ACM Transactions on Networking, vol. 4, No. 5, pp. 758-765, Oct. 1996.
M. Decina et al., "Bandwidth Assignment and Virtual Call Blocking in ATM Networks", IEEE, pp. 881-888, 1990.
ArrayComm, "IntelliCell®: A Fully Adaptive Approach to Smart Antennas", pp. 1-18, dated 2002.

(Continued)

*Primary Examiner* — Kiet Doan
(74) *Attorney, Agent, or Firm* — Banner & Witcoff, Ltd.

(57) ABSTRACT

A system and method for equalizing traffic between antenna beams is described. Aspects of the system and method may vary the beam widths to attempt to equalize traffic based on non-real-time communications and/or non-real-time communications.

13 Claims, 9 Drawing Sheets

OTHER PUBLICATIONS

Internet printout: http://www.vivato.net/prod_tech_technology.html—"Vivato Switches are "Changing the Physics" of Wi-Fi", dated Apr. 20, 2004.

Lehne et al., "An Overview of Smart Antenna Technology for Mobile Communications Systems", IEEE Communications Surveys, Fourth Quarter 1999, vol. 2, No. 4, pp. 2-13.

Joseph C. Liberti, Jr., et al., "Introduction to Smart Antennas: Spatial Processing for Wireless Systems", Smart Antennas for Wireless Communications, pp. 81-116.

Brian D.O. Anderson et al., "Filtering, Linear Systems, and Estimation", Optimal Filtering, pp. 9-61, 1979.

Part 11: Wireless LAN Medium Access Control (MAC) and Physical Layer (PHY) Specifications, ANSI/IEEE Std. 802.11, 1999 Edition. IEEE P802.11 Wireless LANs, Normative Text for Tge Consensus Proposal, pp. 1-25, Sep. 2002.

Stefan Mangold et al., "IEEE 802.11e Wireless LAN for Quality of Service", pgs.

Dr. Richard Roy, Presentation, ArrayComm, "Smart Antenna Technology—Past, Present, and Future", ITS ART Symposium, Sep. 9-11, 1998.

G. Camarillo et al., "Integration of Resource Management and SIP", pp. 1-24, Oct. 2002.

R. Braden et al., "Resource ReSerVation Protocol—(RSVP)—Version 1 Functional Specification", p. 1- 112, Sep. 1997.

The ATM Forum Technical Committee, Traffic Management Specification Version 4.0, Apr. 1996.

The ATM Forum Technical Committee, Addendum to Traffic Management V4.0 for ABR parameter negotiation, pp. 1-3, Jan. 1997.

Guest Editorial, "Congestion Control in High-Speed Packet Switched Networks", IEEE Journal on Selected Areas in Communications, vol. 9, No. 7, pp. 965-967, Sep. 1991.

Marek Wernik et al., "Traffic Management for B-ISDN Services", IEEE Network, pp. 10-19, Sep. 1992.

Roch Guérin et al., "Equivalent Capacity and Its Application to Bandwidth Allocation in High-Speed Networks", IEEE Journal on Selected Areas in Communications, vol. 9, No. 7, pp. 968-981, Sep. 1991.

D. Anick et al., "Stochastic Theory of a Data-Handling System with Multiple Sources", The Bell System Technical Journal, vol. 61, No. 8, pp. 1871-1895, Oct. 1982.

Israel Cideon et al., "Bandwidth Management and Congestion Control in planet", IEEE Communications Magazine, pp. 54-64, Oct. 1991.

F. P. Kelly, "Effective bandwidth at multi-class queues", Queueing Systems 9, pp. 5-16, 1991.

Anwar I. Elwalid et al., "Effective Bandwidth of General Markovian Traffic Sources and Admission Control of High Speed Networks", IEEE, pp. 256-265, 1993.

G. Gallassi et al., "Resource Management and Dimensioning in ATM Networks", IEEE Network Magazine, pp. 8-17, 1990.

G. Gallassi et al., "Bandwidth Assignment in Prioritized ATM Networks", IEEE, pp. 852-856, 1990.

Jay Hyman et al., "Joint Scheduling and Admission Control for ATS-based Switching Nodes", pp. 223-234, 1992.

L. Kleinrock, "Queueing Systems, vol. 2: Computer Applications"—Computer Time-Sharing and Multiaccess Systems, John-Wiley & Sons, pp. 156-269, 1976.

R. Sedgewick, "Algorithms in C, $3^{rd}$ Edition, Part 1-4: Fundamentals, Data Structures, Sorting and Searching"—"Quicksort" pp. 303-333, Addison-Wesley, Aug. 2001.

* cited by examiner

LOAD EQUALIZING ANTENNAS

BACKGROUND

1. Technical Field

Aspects of the present invention relate to antennas. More particularly, aspects of the present invention relate to modifying beams from antennas to maximize throughput through a network while maintaining quality of service requirements.

2. Related Art

Mobile operators and suppliers constantly search for ways to respond to the increasing demand for ubiquitous mobile services. Mobile operators adjust a network's architecture so that they can introduce new higher speed technologies quickly, while suppliers are working to devise ways for improving the capacity of their wireless products. Current trends indicate:

a. Mobile operators have embarked on using wireless local area network (WLAN) technologies to cover hotspots (e.g., airports, shopping malls, etc.) within their cellular networks, and WLANs are already the prevalent means of providing mobile services within large enterprises.

b. Wireless suppliers are exploring adaptive array antenna (dubbed as either "smart" or adaptive antenna) technology as a promising technique for increasing the capacity of their cellular and WLAN products. A "smart" antenna may include an array of radiating antenna elements where the smart antenna radiation patterns, i.e., the smart antenna beams, as well as the directions of these beams may be altered by adjusting relevant parameters (e.g., amplitude and relative phase) on different array elements. Since each beam of a smart antenna has a distinct carrier frequency, and represents a distinct physical channel, the terms "beam" and "frequency channel" are used herein interchangablely.

The current approaches are cumbersome. They do not dynamically adapt directions of frequency channels relevant to at least one of locations and traffic characteristics.

Conventional analytical beam forming techniques usually adjust/control the relevant parameters of a smart antenna such that the signal to noise and interference ratio (SNIR) of each frequency channel is minimized, and its capacity is maximized. The prevalent "optimality" criteria for beam forming techniques are the minimum mean square error (MMSE), and least square (LS) techniques. These techniques use optimal filtering theory to devise a recursive spatial filter that minimizes the square of the difference between the antenna array output and locally generated estimate of the desired signals of subscribers (i.e., a local reference signal) at the transceiver. The MMSE and LS techniques require that the transceiver have either a-priori knowledge or an estimate of the desired signals of subscribers. These estimates are usually obtained using methods such as periodic training sequences, decision directed adaptation, etc. However, they do not dynamically address traffic concerns or locations.

SUMMARY

Aspects of the present invention relate to allocating beams to provide improved service to mobile users as their needs change, thus addressing one or more issues with conventional techniques.

BRIEF DESCRIPTION

DETAILED DESCRIPTION

Aspects of the present invention relate to controlling beams to load balance frequency channels. Aspects of the present invention may be used in conjunction with one or more databases that contain information on the locations and types of services of the users.

Aspects of the present invention may use present uplinks between access points and mobile terminals that recognize the start of frames. Various approaches may be used including strictly synchronous technologies (e.g., Bluetooth, CDMA) and not as strictly synchronous technologies including explicit interactions between 802.11 access points and mobiles on the uplink that provide relevant framing. At least one advantage may include, when using aspects of the present invention in conjunction with a "packet steering" approach on the uplink, reducing power consumption of the mobiles without any degradation in the overall throughput of the antenna system.

The following describes aspects of the present invention that attempts to increase throughput while satisfying the QoS requirements of real-time services (e.g., voice) of smart antenna systems (WLAN and others) whose controller entity may be connected to a database that contains information on the locations and type of services of the users.

Figure 1:
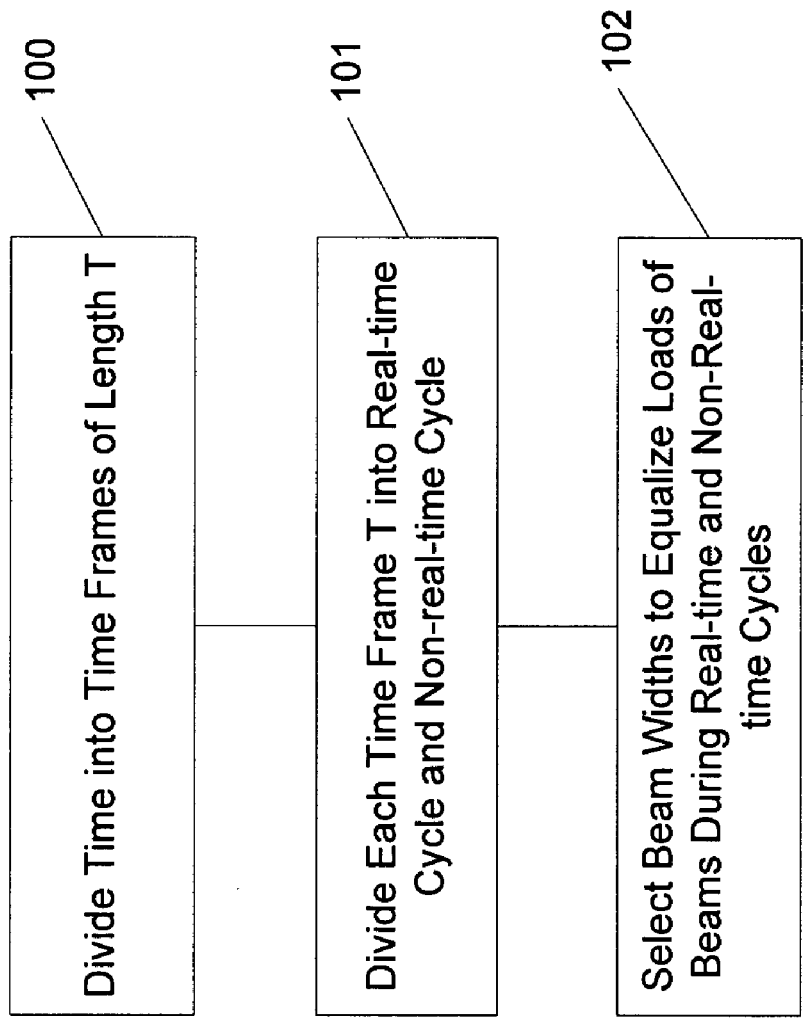
FIG. 1 shows a process for equalizing load among beams in accordance with aspects of the present invention.

Referring to FIG. 1, aspects of the present invention may be described as a process that divides (step 100) time into fixed frames of length T. In step 101, the process divides each time T into a real-time cycle, and ending with a non-real-time one. Next, the process uses the users' locations and relevant information (e.g., capacity, service type) about their sessions to select (step 102) the beam-widths to equalize loads of beams during the real-time and non-real time cycles.

Aspects of the invention may be used with systems that have or may obtain a-priori knowledge of each user location, i.e., ($r_i$ and $\theta_i$), as well as the user's type of service, and updates its database dynamically as the users move around. Here, $r_i$ is the distance of the i-th user from the array antenna, and $\theta_i$ its azimuthal angle. As one example, the session manager (e.g., SIP server) may provide type of service information to a smart antenna controller upon receiving session set-up and disconnect requests (i.e., "INVITE" or "BYE" messages). Various conventional approaches exist to determine a mobile's location and are not addressed in detail here. For instance, in mobile operator networks, one can easily obtain location information via the global positioning system and ranging or hyperbolic position algorithms.

Here, a smart antenna system is expected to provide N distinct frequency channels, i.e., it has N beam-formers (for instance 3 or 4 beam-formers). The maximum, $\omega_{max}$, and minimum, $\omega_{min}$ feasible values of beam-widths are known (for instance, values such as $\omega_{min}=15°$ to $\omega_{max}=80°$ may be realized). The system is also expected to support both types of handoff (i.e., mobile assisted hand-off (MAHO) or network assisted hand-off (NAHO)).

The WLAN or other network may support at least one of real-time (e.g., voice) and non-real-time (e.g., best effort data) services. The loads may or may not be symmetric. The network may further exert admission control on real-time services at the session set up time to properly limit the number of simultaneous real-time sessions in the WLAN environ. In general, the network may exert admission control on all sessions except those transporting best effort data traffic. Here, the equivalent capacity of a session may be the estimated amount of capacity that a network should allocate to a session so that the QoS requirements of the session are met.

Figure 2:
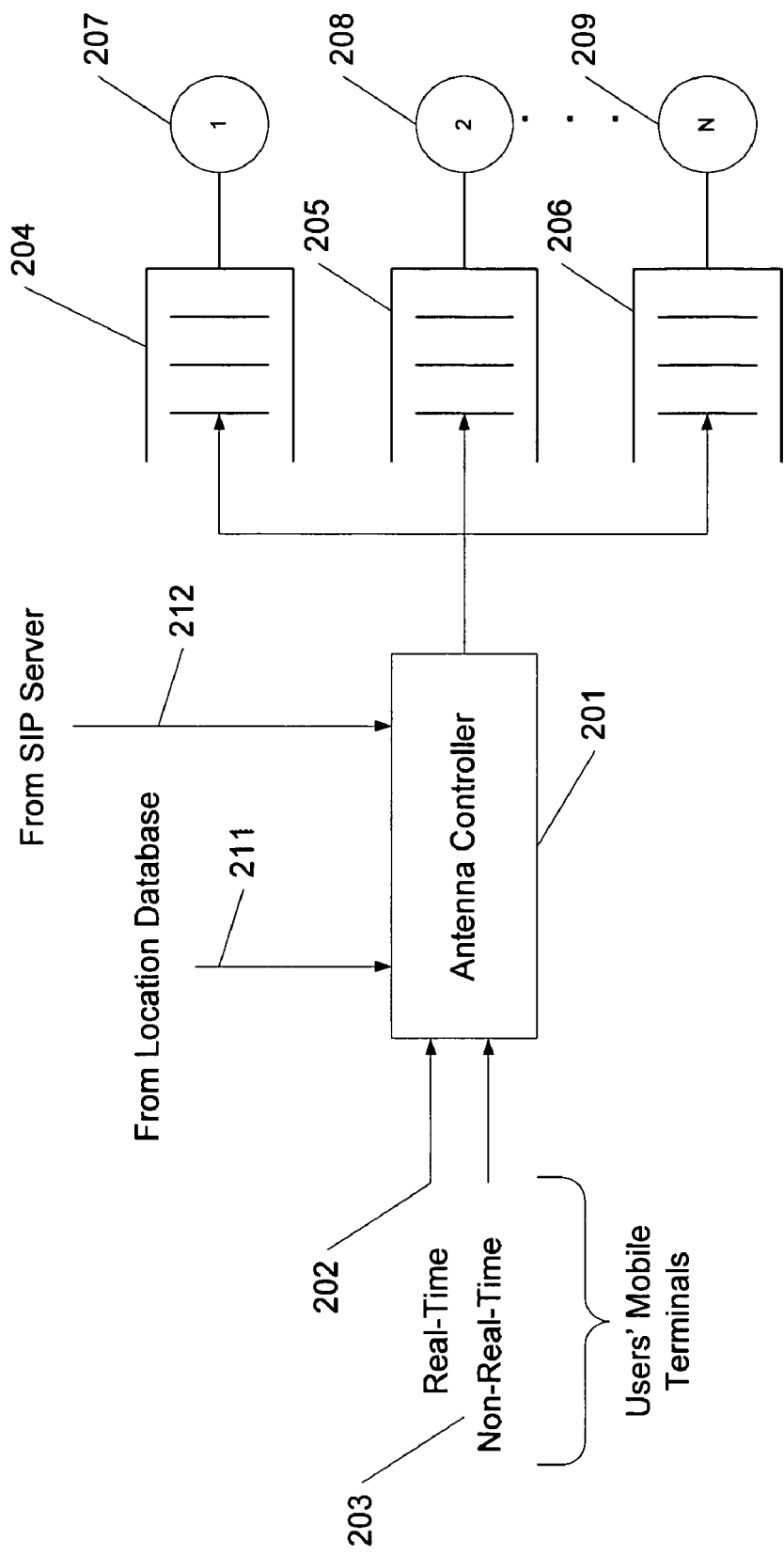
FIG. 2 shows an illustrative example of an antenna controller in accordance with aspects of the present invention.

FIG. 2 shows an illustrative model of a smart antenna system (for use with WLAN or other networks). The system includes antenna controller 201 receiving both real-time 202 and non-real-time 203 inputs. The system may have N queues 204-206 with N parallel servers 207-209 providing support for the two types of customers, i.e., real-time and non-real-time packets. The packets of each user may be stored on each user's mobile terminal. This modeling of the system as a single distributed queue with multiple servers reflects the fact that the actual service time of a packet service is sum of the media access time and its transmission time.

The N parallel servers 207-209 model the N frequency channels of the WLAN smart antenna. The actual service time of a packet equals the waiting time for access to the channel plus the time it takes to transmit the packet itself. For instance, in 802.11, whenever a mobile has a packet, its MAC layer may send an RTS (request to send frame) asking for "permission" to send its packet. The customers in each queue represent packets of the user population who fall within that frequency channels coverage. In FIG. 2, the service time includes the elapsed time for channel access and packet transmission. Thus, a single queue model for each frequency channel is adequate even though on the uplink users packets actually reside in mobiles' buffers that are distributed over the coverage area of the frequency channel. To this end, additional queue approaches may be used.

The antenna controller 201 uses users' locations (211) and relevant information about their sessions such as the desired capacity of a session and its service time (212) to partition the user population, through adjustments in directions of antenna beams, into N subset that "maximize" the throughput of the system, while satisfying quality of service (QoS) requirements of real-time services, e.g., stringent bounds on the delay and jitter of real-time (e.g., voice) packets.

To satisfy the QoS requirements of real-time services, the real-time traffic may or may not be segregated (virtually, not necessarily physically) and may have either pre-emptive priority over non-real-time traffic or receives a periodic service through scheduling.

Also, to maximize the throughput of a queuing system but with only one class of packets, it is helpful to keep the servers as busy as possible.

The following describes the antenna system controller first in view of non-real-time services then addresses real-time services. Since aspects of the described controller distribute the user's traffic load across the frequency channels relatively equally, the controller is referred to as a "load equalizer" or "spatial load equalizer."

Real-Time Services and Non-Real-Time Services

Spatial Load Equalizer

First, systems with only non-real-time services are addressed. Here, for instance, WLAN environment only supports only non-real-time services that have no delay requirements. To "maximize" the smart antenna throughput and ensure that it is equally likely to have a packet or more in each queue, waiting for transmission on each frequency channel, the controller should partition the user population among the N frequency channels such that the traffic load on the frequency channels are relatively equal, and the beam-widths of all frequency channels are in the admissible range for the antenna array.

If the total number of ongoing sessions is U, and the equivalent capacity of k-th session is $C_k$ bps, then the controller may distribute the ongoing sessions into N neighboring regions/zones such that each of the regions contains approximately one-N-th of the total traffic load, i.e., $$S = \left\lceil \frac{\sum_{i=0}^{U-1} C_i}{N} \right\rceil$$

bps, where $\lceil z \rceil$ represents the smallest integer that exceeds Z. This partitioning process may carried out only based on the azimuthal angles of users location because there is only one type of service and users appear in the location database of the smart antenna (provided they are within the antenna range). In general, partition of the coverage area such that each region/zone contains exactly one-N-th of the total traffic load, i.e., S bps is impractical because each region/zone may only contain neighboring users, and sessions may have different equivalent capacities. Thus, instead of looking for strict equality in regions/zones' loads, the approach described herein opts for a spatial load equalizer (i.e., zoning scheme) that distributes the traffic load relatively equally among the regions/zones.

The following describes a process for the spatial load equalizer. First, the equalizer starts with packing neighboring users/terminals in the $1^{st}$ region/zone until either the load of the $1^{st}$ region/zone exceeds one-N-th of the total traffic or the resulting beam-width exceeds $\omega_{max}$. This is shown by the allocation of mobile users in arc 301 defined by the beam width $\omega_0$.

Next, the spatial load equalizer continues with assigning the remaining (i.e., not a member of the $1^{st}$ region/zone) neighboring users/terminals to the $2^{nd}$ region/zone until either the load of the $2^{nd}$ region zone exceeds one-(N−1)-th of the total load of the terminals that has not been assigned to the $1^{st}$ region. This is shown by users in arc 302 with beam width $\omega_1$.

Next, the spatial load equalizer continues with assigning the remaining (i.e., not a member of the $1^{st}$ and/or $2^{nd}$ regions/zones) neighboring users/terminals to the $3^{rd}$ region/zone until either the load of the $3^{rd}$ region zone exceeds one-(N−2)-th of the total load of the terminals that has not been assigned to the $1^{st}$ and $2^{nd}$ regions or the resulting beam-width exceeds $\omega_{max}$. This is shown here by users in arc 303 with beam width $\omega_2$.

This process continues until all N regions or zones are designated.

The width and direction of each beam is set such that it covers one of these regions/zones, and its beam direction points to the azimuthal center of the region.

The spatial load equalizer may be realized with various algorithms that sort the users in view of capacity needed and/or location. For instance, a quick sort algorithm among others may be used. A quick sort algorithm creates a list of ongoing sessions in the descending order of the azimuthal angles of their users. The spatial load equalizer assigns neighboring sessions to a zone/region until either the total load of the zone exceeds S or the resulting beam-width exceeds $\omega_{max}$. Assuming that the azimuthal angle of i-th session's user location is $\theta_i$, and the beam-width of the j-th frequency channel is $\omega_j$, the pseudo code of the spatial load equalizer may be represented follows:

Call the quick sort algorithm to create a list of the sessions in the descending order of their azimuthal angles, $\theta_{U-1}$, $\theta_{U-2}, \ldots \theta_0$, where $\theta_0 \geq \theta_1 \geq \ldots \geq \theta_U$.

---

Set $S = \left\lceil \dfrac{\sum_{i=0}^{U-1} C_i}{N} \right\rceil$, $\varphi = \theta_0$, $\omega = 0$, load = 0, and L = 0;

for (j = L, j < N) {
if(L != 0) L = L + 1;
for ( k = L, k <U) {
load = load + $C_k$;
$\omega = \phi \theta_k$;

if (($\omega \geq \omega_{max}$) $\vee$ (load $\geq$ S)) L = k;
    break;

{ if ($\omega \leq \omega_{max}$) $\omega_j = \omega$;
    else {
    $\omega_j = \omega_{max}$;
    L = L - 1;
    }
load = 0;

$\varphi = \theta_0 - \sum_{i=0}^{j} \omega_i$;

$S = \left\lceil \dfrac{\sum_{i=L+1}^{U-1} C_i}{N - j - 1} \right\rceil$

}

---

First, if a smart antenna is capable of forming beams of arbitrary width in the range of (0-π], designated neighboring "load-equalized" regions/zones should not overlap. However, in practice, when the load equalization algorithm/heuristic designates a region/zone whose beam-width is smaller than $\omega_{min}$, an antenna that directs a beam with width of $\omega_{min}$ to this zone that will overlap with neighboring zones. In other words, if the traffic density at an area is high, this approach may partition the coverage area into narrower non-overlapping zones whose realization in practice results in directing multiple overlapping beams to the heavy traffic area.

Second, as soon as the location database is updated, the controller updates the partitioning accordingly and adjusts the beams directions and beam-widths such that traffic load is almost equally distributed among the N frequency channels. Needless to say when the load equalizer adjusts the smart antenna beams, it may force some users to hand-off even though they may have not moved at all and their locations may not have changed.

a. In a WLAN supporting NAHO, the network controller informs the mobile in advance so that it initiates the process for handing off to the target frequency channel. In general, this early warning feature of the NAHO scheme should result in lower hand-off delay, and better performance.

b. However, in a MAHO only environment such as IEEE 802.11, the load equalizer does not always operates correctly because when the load equalizer adjusts the beams, and directs a current serving beam (frequency channel) away from a mobile terminal (say terminal A) that has not moved since the last beam adjustment, the following two distinct scenarios can occur:

i. The adjustment of the beam results in the drop of the received signal strength at terminal A below the hand-off threshold. In this case the load equalizer operates correctly because the MAHO mechanism of the mobile detects the change of the beam (channel) in the standard way as if it has moved from one beam (channel) to another, and invokes the hand-off process.

ii. The adjustment of the beam does not result in drop the received signal strength at terminal below the hand-off threshold. In this case the MAHO mechanism does not invoke a hand-off process because the quality of reception is still acceptable. Thus, without an additional instruction from the access point, terminal A does not hand-off to the neighboring beam (channel), notwithstanding the fact that the load-equalizer expects it to do so. Thus, in a MAHO only (e.g., an IEEE 802.11) environment, the access point needs a mechanism to instruct terminal A to hand-off to the neighboring beam as the load-equalizer expects.

The implication of the latter scenario is that a MAHO environment (e.g., IEEE 802.11) also requires a NAHO capability that allows the load equalizer to unequivocally inform those mobiles that are affected by the re-configuration of beams. To ensure correct operation of the load equalizer, the MAHO and NAHO schemes may be used as follows:

a. The access point uses the NAHO scheme to inform those terminals that are re-assigned to a different beam as a result of latest beam re-configuration.

b. The terminals continue to use the MAHO for hand-off as they move across the beams themselves.

The next question is what protocol does the access point use for its NAHO mechanism informing the affected mobiles about beam re-assignments. Since the cause of the beam re-assignment is access point reconfiguration, it may use network management protocol, i.e., SNMP in an IP environment, to instruct the affected mobiles to hand-off to a new beam/channel. The detail specifications of the NAHO hand-off protocol is not part of this disclosure. Alternatively, one can invoke lower layer protocols to perform the required NAHO process. The general approach of the NAHO hand-off process is as follows:

a. When the load-equalizer reconfigures the beams, it will send a SNMP SET message to all mobiles that are re-assigned to new beams to inform them about their new frequency channel identifiers, i.e., SET FREQ_CHANNEL "new channel ID". Upon reception of the SET message, the mobile SNMP agent checks and updates the MIB and forces hand-off to the new channel. The advantages of this scheme are that:

i. It uses the standard SNMP protocol for performing the NAHO process; has minimal impact on the mobile hardware, i.e., a register for recording the beam/channel identifier; does not need any new protocols, and can easily be disabled when necessary.
b. Its main disadvantage is that:
i. It requires a running SNMP daemon, and its supporting MIB on the mobile. The presence of an active SNMP daemon on the mobile increases the power consumption of the mobile and takes up part (16-32 MB) of the mobile disk (or memory in PDAs). The notebooks can easily support these requirements. In principle, The PDAs can also support them, however, one may develop "new" link layer NAHO solutions for the PDAs that takes up much less memory space.

Third, regardless of differences in the actual loads of resulting zones, the "load-equalizing" approach primarily assigns contiguous users and their sessions to a zone to ensure smallest possible beam-width and maximum possible range extension even though non-contiguous distribution of users may result in a less difference among the loads of each region/zone.

Fourth, a user may have several simultaneous ongoing sessions. When such a user has only one interface, the load-equalizing algorithm may assign all sessions of this user to one of the frequency channels, even at risk of increasing the "equalization" error (that is intentionally making the frequency channels unequal).

In a special case where all users have identical non-real-time sessions (i.e., equivalent capacity of all sessions are identical), the load-equalizer may partition the coverage area of the smart antenna into N regions/zones such that each region with "equal" session populations, i.e., each frequency channel serves almost 1/N of the sessions. More specifically, if the total number of ongoing session is U, and U=(MN+r), and assuming that the equivalent capacity of k-th session is $C_k=1$ for all $0 \leq k<U$, in the pseudo-code of the load equalizer algorithm, the result is a zoning that distributes these sessions into N neighboring zones such that r of the zones contains M+1 sessions, and the remaining (N−r) zones each have M sessions.

Figure 3:
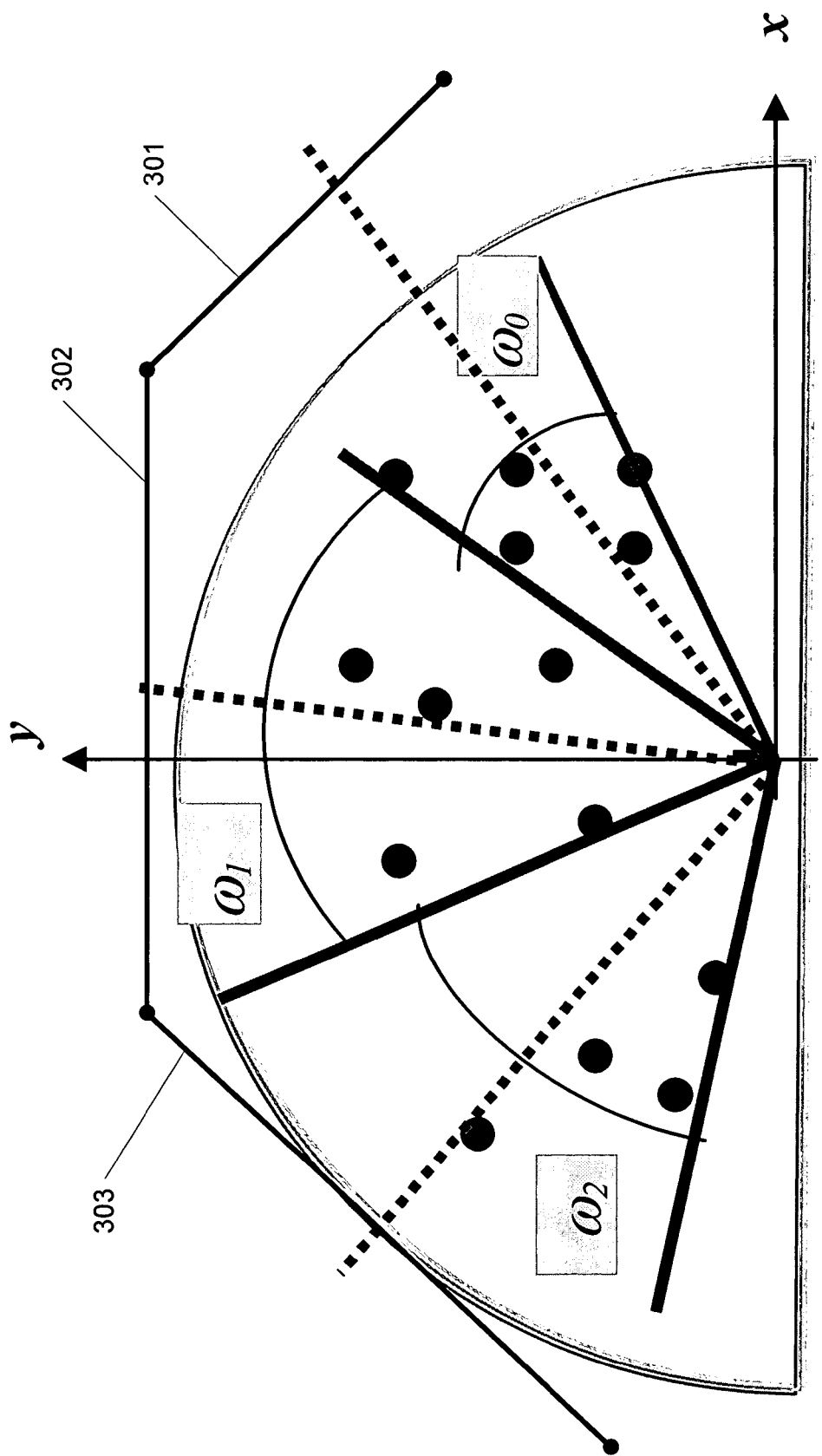
FIG. 3 shows a graphical representation of beam widths being modified in accordance with aspects of the present invention.
Figure 4:
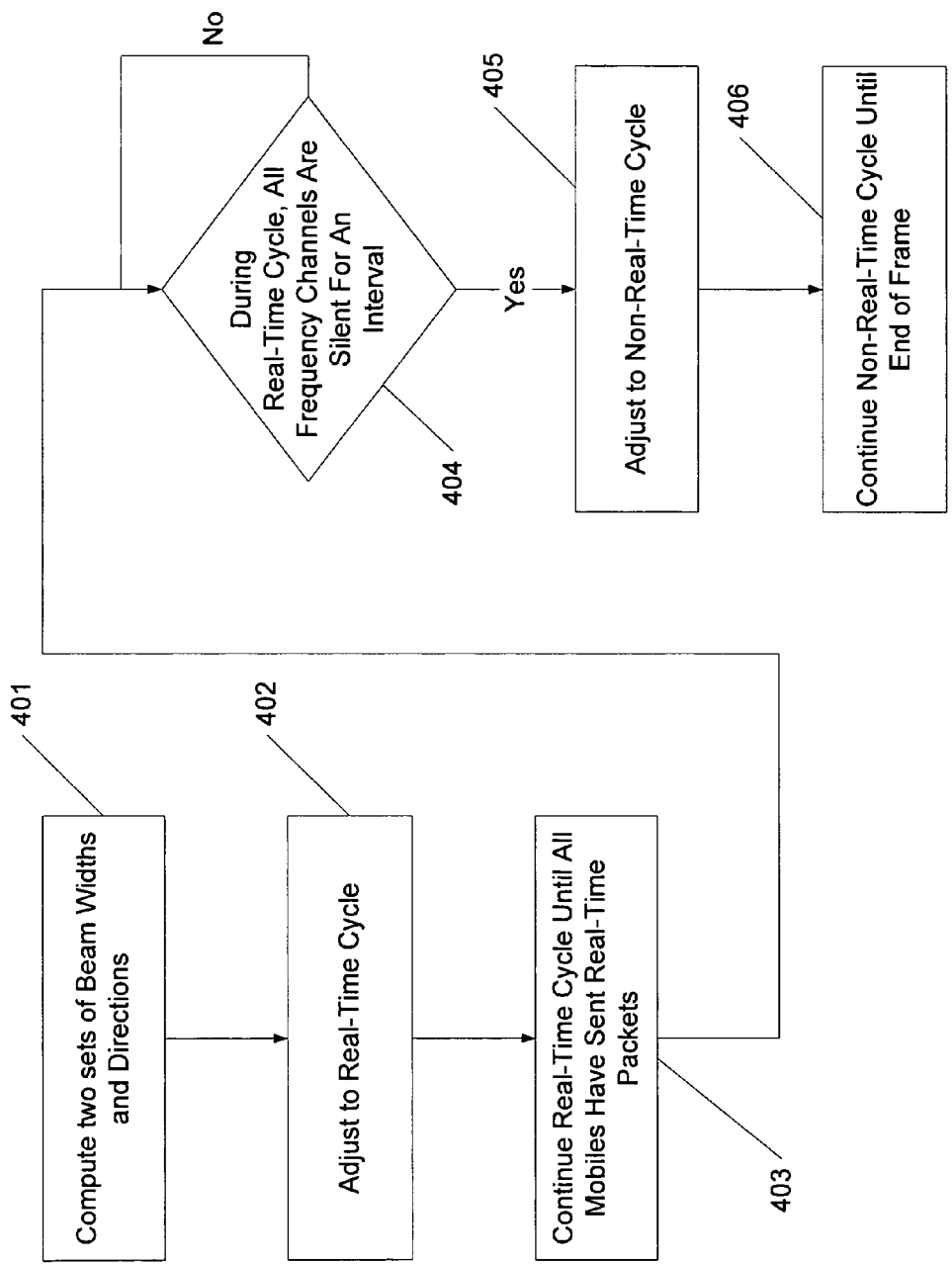
FIG. 4 shows a process for equalizing load among beams in accordance with aspects of the present invention.

FIG. 3 in summary provides the behavior of the spatial load equalizer in a WLAN smart antenna with N=3 frequency channels and U=14=4N+2 users, where each user has an ongoing best effort data session. The solid outgoing lines show the boundaries of the frequency channels with beam-widths of $\omega_0$, $\omega_1$, and $\omega_2$, and the dotted lines depict their directions.

The described spatial equalizer may determine the beam-widths in a WLAN environment that supports real-time and non-real-time services concurrently as well. The spatial equalizer performance is acceptable if the load of ongoing real-time sessions in each frequency channel (or beam) does not exceed the maximum real-time load that it can support. However, if the load of real-time sessions exceeds the maximum that a channel can support, then the QoS requirements of these sessions may not be satisfied. The system may or may not then use only locations of real-time users/sessions to adjust the antenna beams. This approach may satisfy the QoS requirements of the real-time sessions, though it may degrade the performance (e.g., throughput, packet loss) of the non-real-time services because it may result in skewed distribution of non-real-time sessions across the beams. The following describes another approach to addressing multiple classes of service.

Temporal-Spatial Load Equalizer

The temporal-spatial load equalizer may be a time-division variant of the spatial load equalizer that time-shares the smart antenna system between the real-time and non-real-time services such that the throughput is "maximized" and the QoS requirements of the real-time services are satisfied. The temporal-spatial load equalizer divides the time into equal frames of size T, where every frame comprises a real-time and a non-real-time cycle. During the real-time cycle, only real-time sessions that have packets can transmit. Similarly in the non-real-time cycle only sessions with non-real-time services can send packets. During each real-time (or non-real-time) cycle, the behavior of the temporal-spatial equalizer is similar to that of a spatial load equalizer that supports only real-time (or only non-real-time) sessions. In other words, during the real-time (or non-real-time) cycle, it distributes the real-time (or non-real-time) sessions into N regions/zones whose traffic loads are relatively equal, and tailors the beam-widths and directions of the frequency channels to the regions/zones.

The frame size T is usually equal to the time it takes the slowest real-time application to generate a packet on the session. For example, for a voice application software that generates a voice packet every 20 ms, 40 ms, or 80 ms, T may be set to 20 ms, 40 ms, or 80 ms for the environment in which the voice application software is used.

Specifically, assuming that the mobile stations and the smart antenna correctly recognize the start of the frames (if and when necessary), i.e., having consistent framing structure across the access point and mobiles, the temporal-spatial load equalizer operates as follows:
a. At the beginning of each frame, i.e., every T seconds, it computes two sets of beam-widths and directions, one for voice real-time cycle (i.e., considering only real-time sessions), and the other for non-real-time cycle (i.e., considering only non-real-time sessions) in step 401.
b. Adjust the beams in accordance with the real-time cycle in step 402.
c. Continue the real-time cycle until all mobiles have sent their all their real-time packets in step 403.
d. On the uplink, the system determines if during the real-time cycle all frequency channels remain silent for at least an interval (for instance, $(2\tau+\mu)$ sec, where $2\tau$ is the round trip propagation delay on a frequency channel, and $\mu$ is the service (access plus transmission) time of a real-time packet on a frequency channel) in step 404.
e. If no from step 404, the system waits until the interval has passed.
f. If yes from step 404, then in step 405 the temporal-spatial load equalizer starts the non-real-time cycle and continues it to the end of the frame in step 406.

Specifically, the controller re-adjusts the antenna beam-widths and directions such that the load of non-real-time sessions is equally distributed among them. The downlink may wait for an interval to pass as well. However, on the downlink an optimization may be realized in that the controller may start the shift to the non-real-time cycle as soon as the smart antenna has depleted the real-time services buffers.

On the uplink, the preceding algorithm requires that the mobiles and the smart antenna system correctly identifying the start of the frames. Otherwise, on the uplink, the temporal-spatial load equalizer may not operate properly because users are distributed across the media and have no single reference for the start of a frame, or different cycles within a frame. However, there is no need for strict framing on the downlink because the antenna itself knows the start of a frame or its cycles, and mobiles' receivers pick up the signal when they receive the signal. Two approaches may be used for ensuring consistent framing structure across the access points and the mobiles on the uplink,
   a. strict synchronization between the access points and the mobiles, and
   b. explicit messaging/interaction between the access point and mobiles for announcing the start of frames.

Strictly synchronous technologies such as Bluetooth, CDMA) automatically provide consistent framing structure across the access point and mobiles. However, the synchronization on the uplink may create an issue for 802.11b WLAN because the IEEE 802.11b specifications do not provide means of such a strict synchronization between the access point and mobiles. Bluetooth Masters (analogous to APs in WLANs) in fact, do have strict synchronization with Slaves (analogous to mobiles in WLANs), and they do know when each slave will transmit and do know whether each Slave is real-time (e.g., voice) or non-real-time (e.g., data).

There are at least two ways to deal with the 802.11b issue. The first solution is the use of a polling mechanism in the smart antenna system that determines which user has the right to transmit. This approach is analogous to the Point Coordination Function (PCF) specified in the specifications of the 802.11 media access control (MAC) scheme. The advantage of this approach is that it allows contention free voice cycle and potentially increases the number of simultaneous voice sessions per frequency channel. In a nutshell, this addition to 802.11 MAC provides means of four classes of priorities for users packets and an enhanced polling mechanism similar to the PCF that is dubbed as hybrid coordination function (HCF) in this specifications. Preliminary performance evaluation studies show that "the HCF provides means of delivering time-bounded traffic, but requires all stations within the range of the HC (Hybrid Coordinator) to follow its coordination."

In the absence of strict synchronization, one can use explicit messaging between the access point and the mobiles to provide a consistent framing structure on the uplink beam. In this approach, the access point periodically sends announcement messages to inform the mobiles about the start of a new frame. Having announcement messages, the access point may also opt for using it to also inform the mobiles about the end of the real-time (start of non-real-time) cycle within each frame. This use of announcement messages for informing mobile about the end of the real-time (start of non-real-time) cycle may improve the throughput of the system on the uplink because it reduces the silence between the cycles by τ seconds. A start of frame announcement message is an 802.11 MAC_PDU whose 2 byte Control Field are encoded as follows:
   a. Protocol version: 00, for all frames
   b. Type: 01, i.e., control MAC_PDU for both START/END
   c. Subtype: 0000 for START, and 0001 for END
   d. The remaining bits of the Control field are ignored This approach introduces negligible additional signaling overhead, and its START/END control MAC_PDUs do not require acknowledgements by the mobiles because their payloads are null, and the 4 byte long FCS field of the MAC_PDU protects its 2 byte long control field.

Some have proposed an adaptive antenna that measures the aggregate transmission rate of users over its frequency channels and adapts their beam-widths such that the sum of beam-widths of all frequency channels (i.e., the coverage area) remains constant; the beam-width of the channel with highest traffic is narrowed a certain amount (say λ degrees), and the beam-width of the channel with lightest traffic is widen the same amount (i.e., λ degrees); and the beam-widths of other frequency channels remain constant. At least one of the following distinguishes a load equalizing smart antenna from the adaptive antenna scheme as described above in that a load equalizing smart antenna:
   a. adapts not only to the aggregated traffic rate but also users' locations and service types;
   b. time-shares the antenna between real-time and non-real-time services in a cyclic manner to virtually segregate these services, and reduce the adverse effect of non-real-time services on the performance of their real-time counterparts;
   c. distributes the traffic load of each service class (e.g., real-time) almost equally across the frequency channels during the class's cycle in each frame to "fairly" improve the QoS for all users; and
   d. tracks users' traffic and locations dynamically and does not always insist on continuously covering a nominal pre-determined geographic area, though it periodically adjusts its beams to sweep the whole nominal coverage area of the smart antenna, and pick up all users who are active there.

Figure 5:
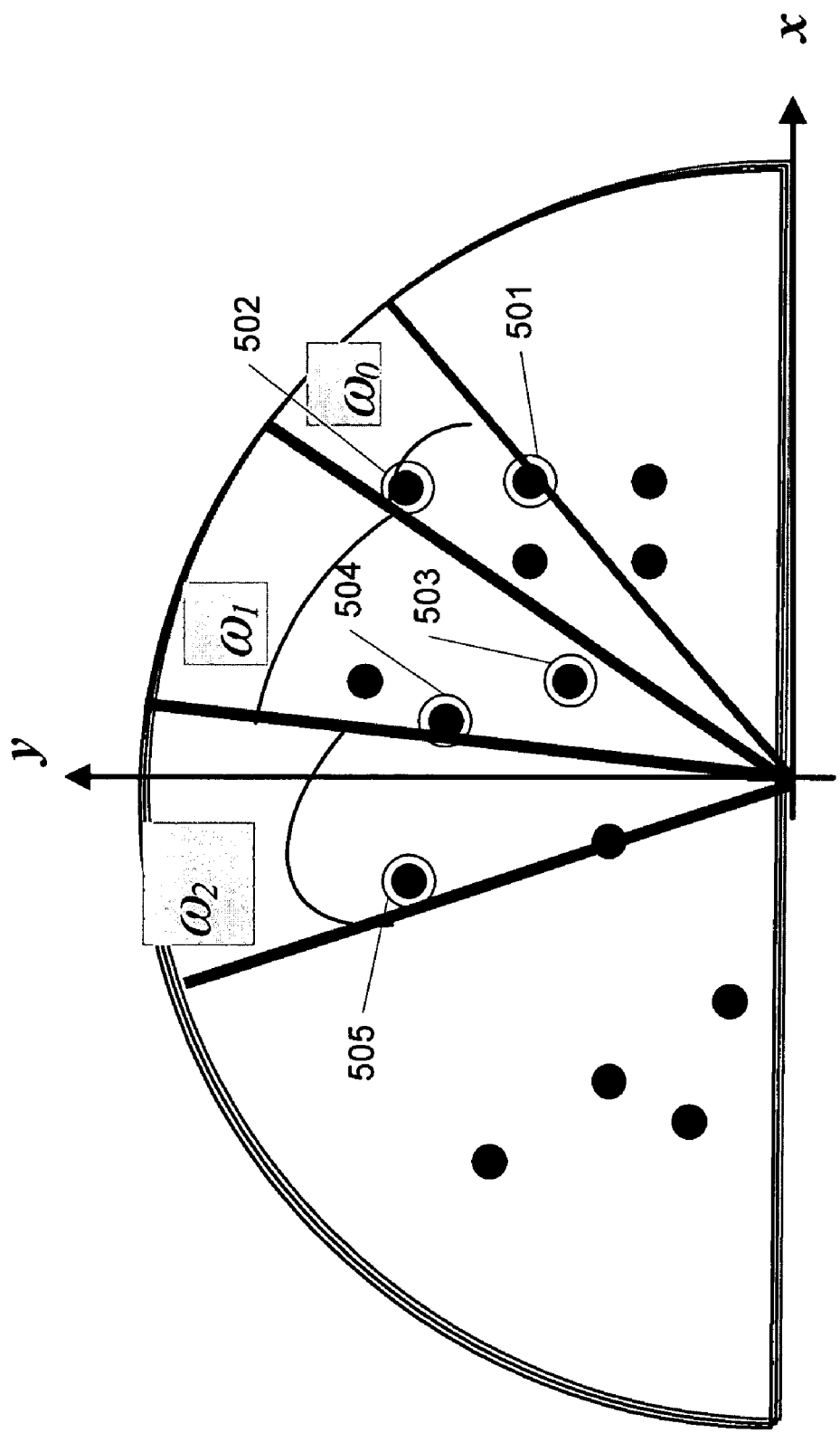
FIGS. 5 and 6 show graphical representations of beam widths being modified in accordance with aspects of the present invention.
Figure 6:
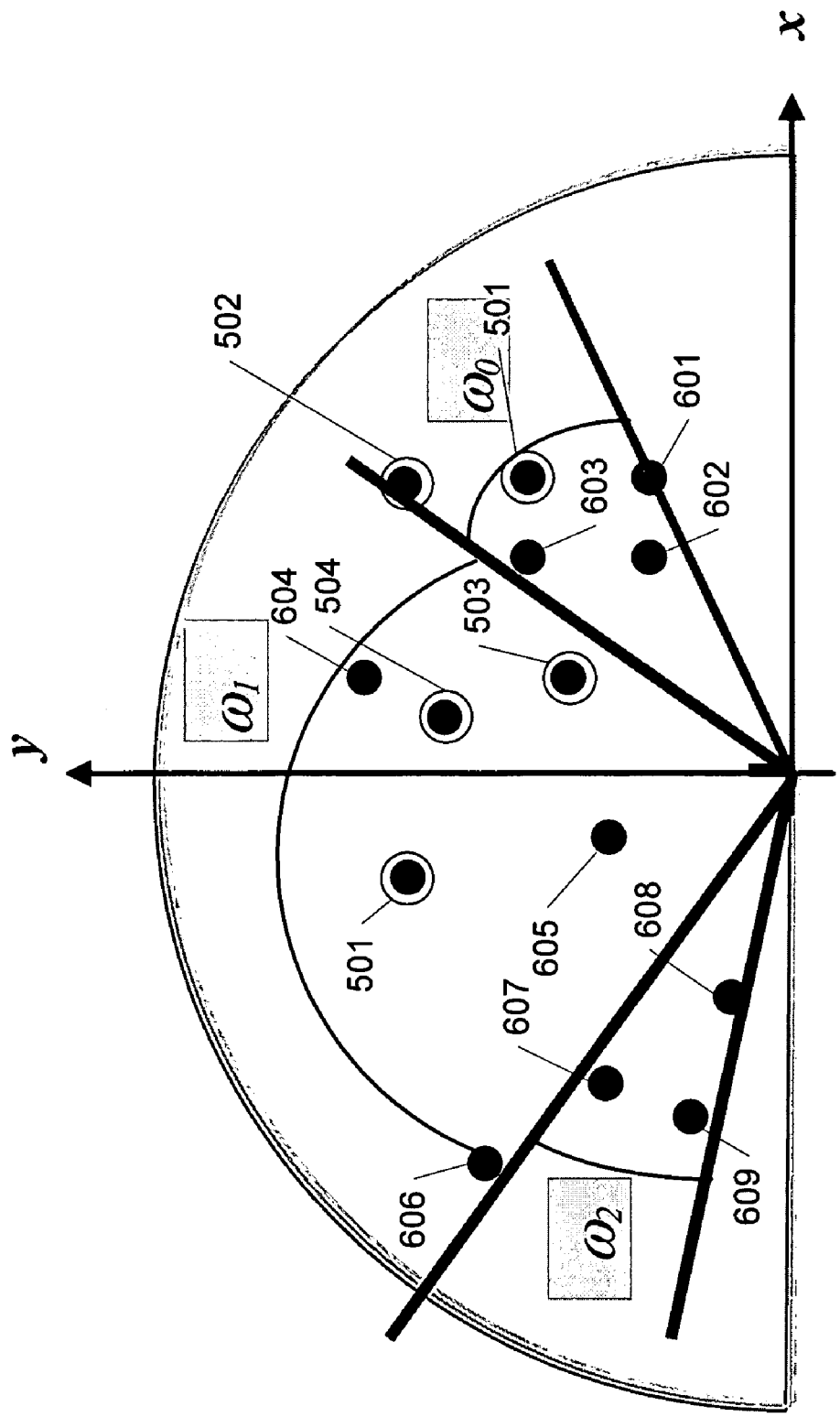

Assuming that the system supports only identical voice services and identical best effort data services, FIG. 5 shows an illustrative example with N=3 frequency channels, with five (depicted as concentric rings) of its fourteen users have voice sessions, while the remaining nine are using data sessions. Since all voice sessions are identical, the equivalent capacity of a voice session is unity, i.e., $C_k=1$ for all sessions, to arrive at FIG. 5 for the beam-widths of the frequency channels, $\omega_0$, $\omega_1$, and $\omega_2$, during the voice cycle at the beginning of a frame. FIG. 6 shows the same mobile terminals during a non-real-time cycle of the frame.

In FIG. 5, the three beams cover primarily the real-time mobile terminals. Beam $\omega_0$ covers real-time mobile terminals 501 and 502 (designated as real-time with a ring around each). Beam $\omega_1$, covers real-time terminals 503 and 504. Beam $\omega_2$ covers real-time mobile terminal 505.

In FIG. 6, the three beams cover all the mobile terminals. Beam $\omega_0$ covers mobile terminals 501, 502, 601, 602, and 603. Beam $\omega_1$, covers mobile terminals 503, 504, 604, 605, and 606. Beam $\omega_2$ covers mobile terminals 505, 607, 608, and 609.

For simplicity in the temporal-spatial equalizer example of FIGS. 5 and 6, users are shown to have either have voice or data service. However, this is not a requirement and a user can have both voice and data services simultaneously. A user who simultaneously uses both classes of services is counted as the member of voice population (real-time) as well as that of data user population (non-real-time). Also, in order to satisfy the delay requirements of the sessions, particularly the real-time ones, the network may or may not use an admission control policy to properly limit that the number of ongoing sessions, real-time, as well as non-real-time when necessary, per frequency channel.

Load Equalizer with Packet Steering

In a wireless environment, benefits found in reducing the power consumption of each mobile. In order to do so, the load equalizer may be used in conjunction with packet steering approach as known in the art on the uplink beam. Using packet steering, after receiving the request to send (RTS) message from a mobile and granting transmission right to it, the load-equalizing smart antenna directs a point-to-point receive (uplink) beam, i.e., as narrow a beam (e.g., 15°±5°) or as narrow as the antenna array can create, to the location of the mobile. After receiving the packet from the mobile, it may send its acknowledgement (ACK) packet on the downlink beam while restoring the uplink beam to its normal beamwidth set by the load equalizer so that it can hear RTS packets of all mobiles assigned to a frequency channel. The smart antenna repeats this process after granting the transmission right to a mobile.

Components of the Temporal-Spatial Load Equalizer

Figure 7:
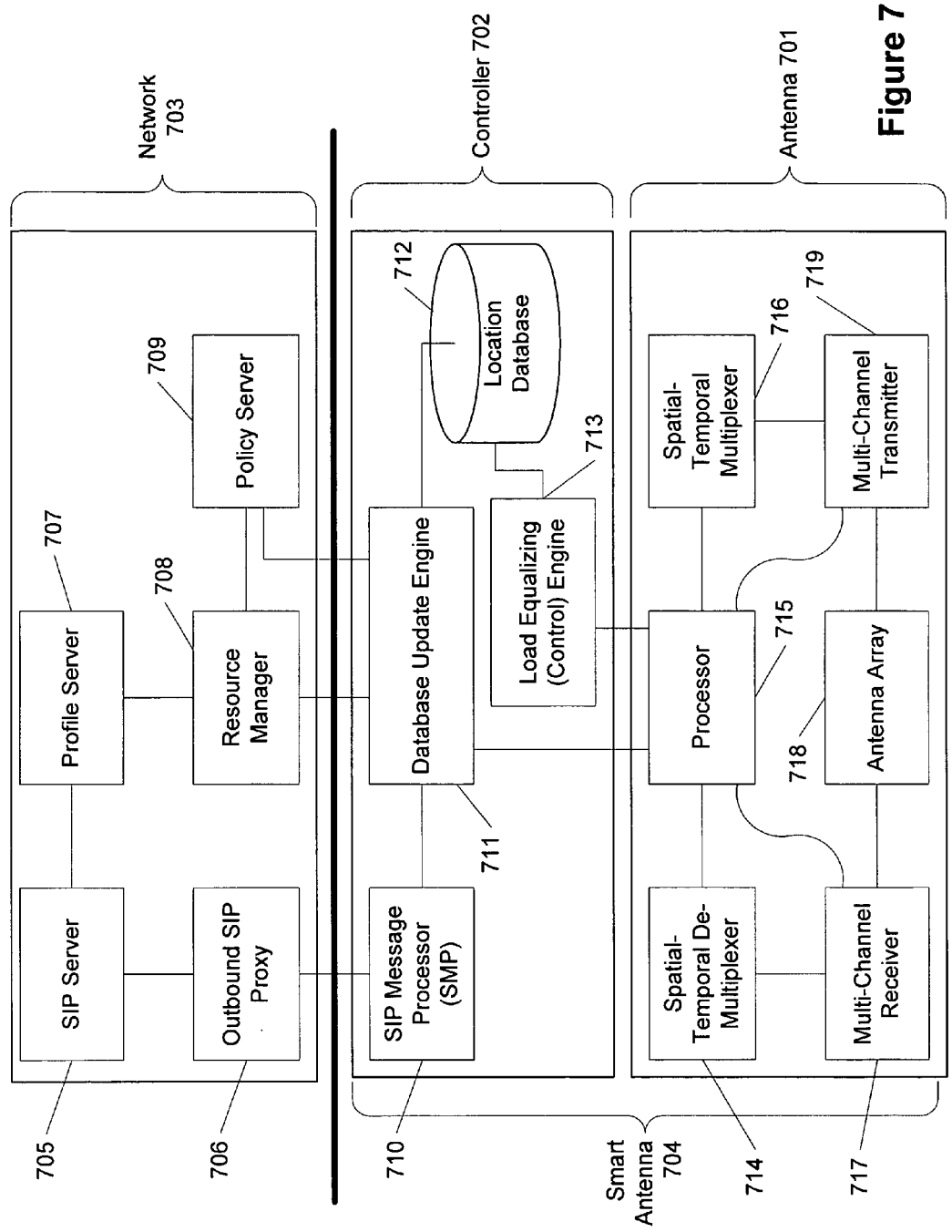
FIG. 7 shows an illustrative example of a system architecture in accordance with aspects of the present invention.

FIG. 7 shows an illustrative architecture that may be used in conjunction with a load-equalizing smart antenna. The architecture may include a smart antenna system 704 having an antenna 701 and antenna controller 702. Antenna controller 702 interacts with network 703. Network 703 may include transport, control and management entities. For simplicity, FIG. 7 shows those elements of the network that interact with the controller 702 (including Outbound SIP Proxy 706 that is connected to a SIP Server 705, which is in turn connected to profile server 707. Profile server 707 may be connected to resource manager 708, which may be connected to policy server 709. The arrangement of elements in network 703 is for example only. Other relationships may be used as well.

The controller 702 may include a SIP message processor (SMP) 710 that exchanges information with outbound SIP proxy 706 and database update engine 711. Controller 702 may also include a database update engine 711 that exchanges information with resource manager 708, SMP 710, and policy server 709 and stores information in location database 712. Controller 702 may further include a load equalizing (and control) engine 713 that exchanges information with location database 702.

Antenna 701 may include a spatial-temporal de-multiplexer 714 and a spatial-temporal multiplexer 716. Both may be connected to processor 715. The antenna 701 may further include a multi-channel receiver 717 connected to the de-multiplexer 714 and processor 715. The antenna 701 may further include a multi-channel transmitter 719 connected to the multiplexer 714 and processor 715. The multi-channel receiver 717 and multi-channel transmitter 719 may be connected to the antenna array 718.

Processor 715 computes (or captures necessary data for computation of) the direction of arrival (DOA) of users'mobile terminals and passes it (or them) to the load equalizing engine 713. The processor 715 may also receive the beam-widths from the load-equalizing engine of the controller 702 (or controllers 702) and translate them into appropriate weight vector for steering the antenna beams from antenna 701 (or antennas 701). For each network 703, there may be one or more controllers 702 and one or more antennas 701. For each controller 702, there may be one or more antennas 701. Further, each controller 702 may be connected to one or more networks 703.

The controller 702 obtains and processes information regarding the users' locations and their services and turns the information into control actions for steering the antenna 701's beams in accordance with the operator's policies. For instance, the load-equalizing engine 713 may be a policy enforcement point (PEP) whose task is to use users location and services data to maximize the throughput of the smart antenna, i.e., it may realize the temporal-spatial load-equalizing approaches described above. The load-equalizing (or in general, the control) engine 713 represents a dynamic policy enforcement point that can enforce any operator's policies. The controller 702 may include the following:

a. A SIP Message Processor (SMP) 710 that is call/session-state processing engine.

The SIP Message Processor (SMP) 710 receives a copy of signaling messages from and to users located within the coverage area of the antenna 701, processes/filters them to get (or update) information regarding users and their services and sessions, and forwards the information to the database update engine 711 for updating information in location database 712;

b. A standard (e.g., a SQL) location database 712 that contains users locations, their ongoing sessions and types of services on these sessions;

c. A load-equalizing engine 713 that uses data in the location database 712 to realize the temporal-spatial load equalizing heuristic set forth above. A policy enforcement point may enforce the control policy prescribed by the policy server; and d. A database update engine 711 that initializes and updates the location database 712 according to the information received from the SIP Message Processor (SMP) 710, and the processor 715 of the antenna 701.

The controller 702 is shown as separate from antenna 701. Alternatively, controller 702 may be integrated with antenna 701. Further, controller 702 may be integrated with outbound SIP proxy 706 in network 703 or somewhere between network 703 and antenna 701 (e.g., integrating the SIP message processor (SMP) 710 with the outbound SIP proxy 706 and the rest of its entities with the antenna 701. In general, the controller 702 may become an integral part of a mobile communication server (MCS).

User Services and Sessions

The following relates to relevant information regarding user' services and sessions and how controller 702 initializes location database 712, obtains relevant data, and updates location database 712.

User Data Object

Figure 8:
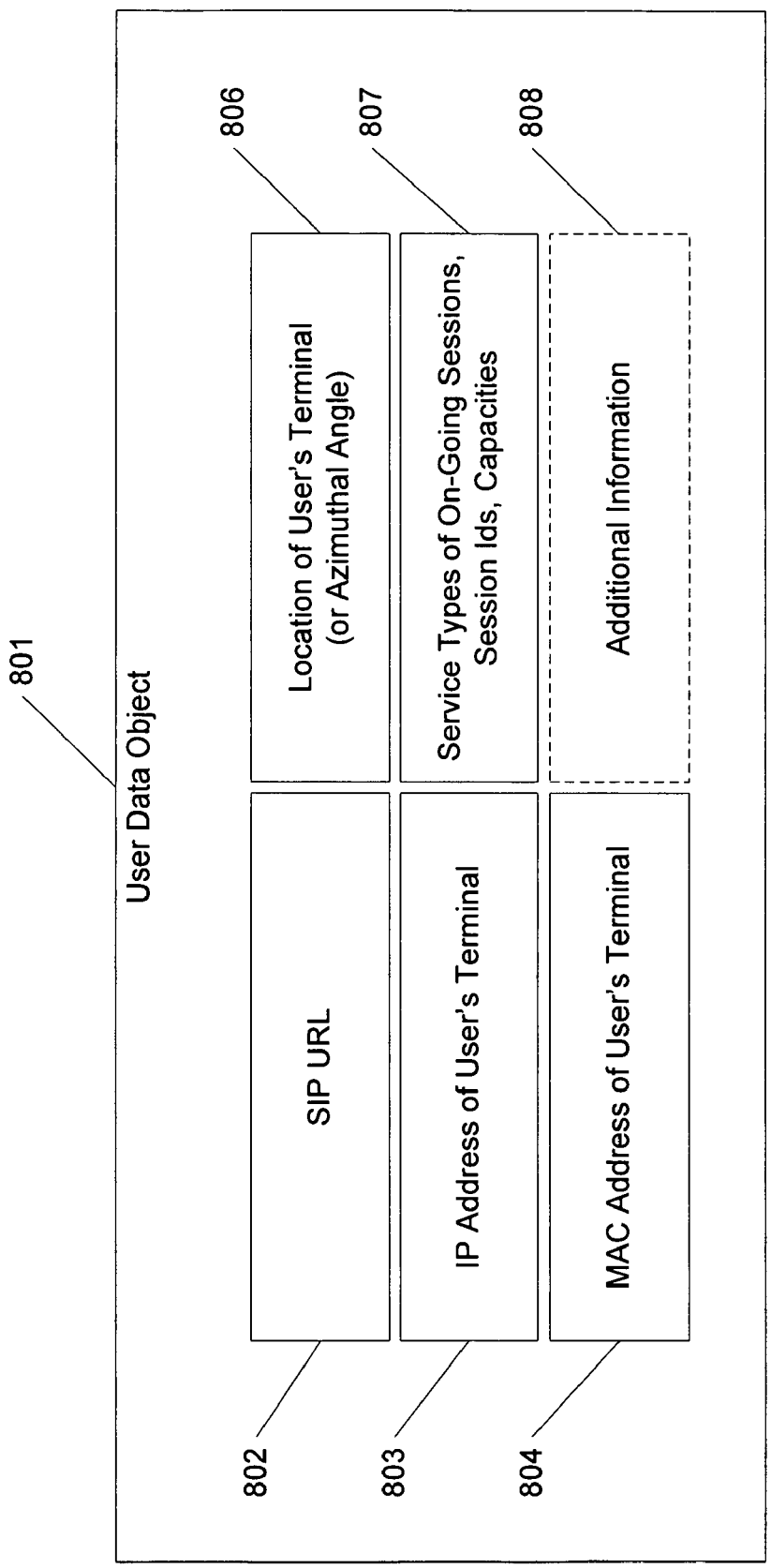
FIG. 8 shows a data structure of a user data object in accordance with aspects of the present invention.

Each user's mobile terminal may be identified by a user data object in the location database 712 that contains all relevant information on the location of the terminal and ongoing sessions and services originated from or terminated at the user's terminal. A user data object 801 may include one or more of the following attributes as shown in FIG. 8:

a. The SIP URL of the user 802;

b. The IP address of user's terminal 803;

c. The MAC address of the user's terminal 804;

d. The location (and/or the azimuthal angle) of the user terminal (absolutely or in relation to antenna 701) 805; and e. The service types of ongoing sessions originated from the user's mobile terminal or terminated on it, the SIP session identifiers (Session IDs), as well as their corresponding equivalent capacities 807.

f. Additional information may or may not be included as 808.

In general, the triplet comprising the MAC address of user's terminal, its IP address, and the user's SIP URL may be used to identify and update a user data object in the location database 712 of the antenna 701. The MAC address of the terminal identifies it regardless of user services and/or mobility patterns as well as network protocols for supporting mobility. The MAC address may operate as one or more object identifiers in the location database 712 for associating user services and sessions to the location of the mobile terminal. The SIP signaling messages identify a user's session by her/his URL and IP address. The body of the SIP REGISTER message may associate/map user URL and IP address with/to MAC address of her/his terminal. The SIP URL in the session setup messages may associate a session with the user but not always with her/his terminal due to the service mobility. For instance, a user may transfer an ongoing session from her/his mobile to another appliance (e.g., her/his office telephone) that does not necessarily appear in the location database. In this case the IP address within the SIP RE_INVITE (or UPDATE) message may indicate that this session has been transferred to another appliance and can be removed from the user data object representing her/his mobile and its ongoing activities. It allows the database update engine 711 to remove this session from the user data object.

Initialization and Update of the Location Database

An attribute of the user data object that assists in a load equalizing antenna is the location or the azimuthal angle of the location of the user's terminal. The angle may be detected directly or determined from absolute location identification information (GPS, triangulation, or hyperbolic location identification information). An antenna system may use received signals in conjunction with either a position location or Direction of Arrival (DOA) estimation algorithm as known in the art to obtain the azimuthal angle of the user (i.e., terminal) location. Three issues exist with using DOA information in a smart antenna:

a. How is the location database 712 initialized at the start up of the antenna system?
 b. How does the controller 702 ensure that the load equalizing (control) engine's 713 dynamic adjustment of the beam-widths and their angles leaves no in-active users/terminals left out of the system coverage and service for an unacceptable (or indefinite) period of time?
 c. How are the locations, service types and equivalent capacities of sessions obtained and stored in location database 712?

To address the first issue, the antenna's beam-widths and their angle may be initialized such that they cover the whole area at the system startup time. The load equalizing (control) engine 713 assigns initial beam-widths to $\omega_k = \pi/N$, $0 \leq k < N$. For instance, a load-equalizing engine starts a three beam antenna with $\omega_0 = \omega_1 = \omega_2 = \omega_3$, and starts enforcing the load-equalizing methodology as soon as the initialization interval is expired. The exact value of the initialization interval duration depends on how long it takes the DOA algorithm to determine the locations of all active terminals within the coverage of the system.

The database update engine 711 then initializes users' data objects with at least one of their locations and MAC addresses, while setting the remaining objects to "NULL" until the database update engine 711 receives information on the URLs, IP addresses, and Session IDs and traffic descriptors from the SIP Message Processor (SMP) 710. Database update engine 711 processes the information received from the SIP Message Processor (SMP) 710 to derive and update the remaining attributes of a user data object.

To address the second issue, i.e., allowing users to rejoin the system when they become active again after a period of silence is similar to that of the first question, with a difference that the latter is a periodic process, while the former may be a task that is performed relatively infrequently. In other words, the load equalizing (control) engine 713 of an antenna 701 that has N beams periodically (for instance, every $T_p$ sec) suspends its load-equalizing beam forming, and creates beams of width $\omega_k = \pi/N$, $0 \leq k < N$, to sweep the whole coverage area and instate (or re-instate) all the active users in the location database. As in the initialization task, the length of the suspension time depends on the DOA algorithm. The trade-offs in the choice of the database updating period, $T_p$, are that it should be 1) much larger than the temporal-spatial frame size T so that the impact of these updates on the performance of the load-equalizer is relatively negligible, and 2) small enough to ensure that chance of locking out an off-hook user is minimal.

Alternatively, another beam may be created (from the same antenna array or another antenna array) to sweep the area to check for all, new, or rejoining mobile terminals.

To address the third issue, the database update engine 711 may modify the database upon reception of new locations, sessions, and services information from either the SIP Message Processor (SMP) 710 or the processor 715 of the antenna 701.

When the database update engine 711 receives data from either the SIP Message Processor (SMP) 710 or the processor 715 of the basic smart antenna, the database update engine 711 processes the information (e.g., calculates the equivalent capacity of the session) as needed, and updates the corresponding user data object, if the object already exists in the database. Barring abnormal conditions, the object may already exist in the database. Otherwise, it creates a new user data object in the database whose identifier is used to access it. The identifier may or may not be the MAC address of the "new" user's terminal.

The database update engine 711 may expunge the stale user data objects if and when needed. For instance, old objects (a few minutes or hours old with no subsequent updates) may no longer be relevant. If the antenna does not receive signal from a user mobile for an extended period of time, it considers her/his user data object stale. In this regard, a user data object may be considered stale, if either the user terminal is broken or it has not renewed its registration for a long period (as specified by the operator's policies) of time.

Obtaining Information on Users Sessions and Services

The controller 702 maintains information regarding a user, his/her terminal MAC and IP addresses, and ongoing sessions and services from SIP signaling messages. With regards to IEEE 802.11 WLANs, a terminal usually registers with the access point first before being able to send information. Thus, the MAC address and location attributes of a user data object usually appear in the location database before the others.

The attributes of a user data object that may be obtained from SIP messages are user SIP URL, IP address and corresponding MAC address of her/his terminal, "Session-IDs" of its ongoing sessions, and their service requirements. Alternatively, these may be derived from other sources. The URL and terminal addresses at the MAC and IP levels can be obtained during SIP registration message flow, while the information regarding ongoing sessions and their services can be derived from the SIP call setup message exchange. The SIP outbound proxy 706 is in the route of signaling messages of mobile originated and mobile terminated sessions of users within the coverage area of the antenna 701. It copies signaling messages to and from users within the coverage area of the antenna 701 to the SIP Message Processor (SMP) 710. The SIP Message Processor (SMP) 710 filters these messages to obtain the required information for passing to the database update engine 711.

The SIP Message Processor (SMP) 710 ensures that the user data objects of the location database contain correct and up to date information regarding the URLs, IP addresses, and MAC addresses of users. The SIP Message Processor (SMP) 710 may perform this and other tasks through one or more of the following:

a. Upon reception of SIP REGISTER message from the outbound SIP proxy 706, the SIP Message Processor (SMP) 710 processes the message, both the header and the body, to obtain at least one of the user URL, its terminal IP address, its MAC address, as well as the registration Session-ID. The registration session ID, user URL and IP address of his/her terminal are available in the SIP REGISTER header. The MAC address may be obtained from the REGISTER message body.
 b. When mobile IP provides terminal mobility, the user NAI (i.e., the Home IP address of the user) may be located in the CONTACT field of the SIP register message. Particularly, in the case of cross appliance service mobility, after the change of appliance, the CONTACT field may be set to the NAI of the changed-to mobile terminal. Then, the database update engine 711 knows that the session does not any belong to the original mobile terminal.

c. Upon the reception of the "200" OK message with the same registration Session-ID, SMP forwards the MAC address, IP address, and the URL to the DB update engine. The DB update engine uses the MAC address to identify the user data object whose SIP URL and IP address attributes should be updated.

The following describes the separation of resource and session management in SIP and its implications. As is known in the art, the SIP specifications separates resource management and session management functions. As far as SIP is concerned, resource management is a pre-condition for setting up sessions. Here, the request for setting up a session with a certain amount of resources cannot be completed until resources are reserved, though SIP itself does nothing about getting these resources, and it is up to the end users to obtain necessary resources. However, other protocols may permit the network to take a more active role in reserving the resources.

Figure 9:
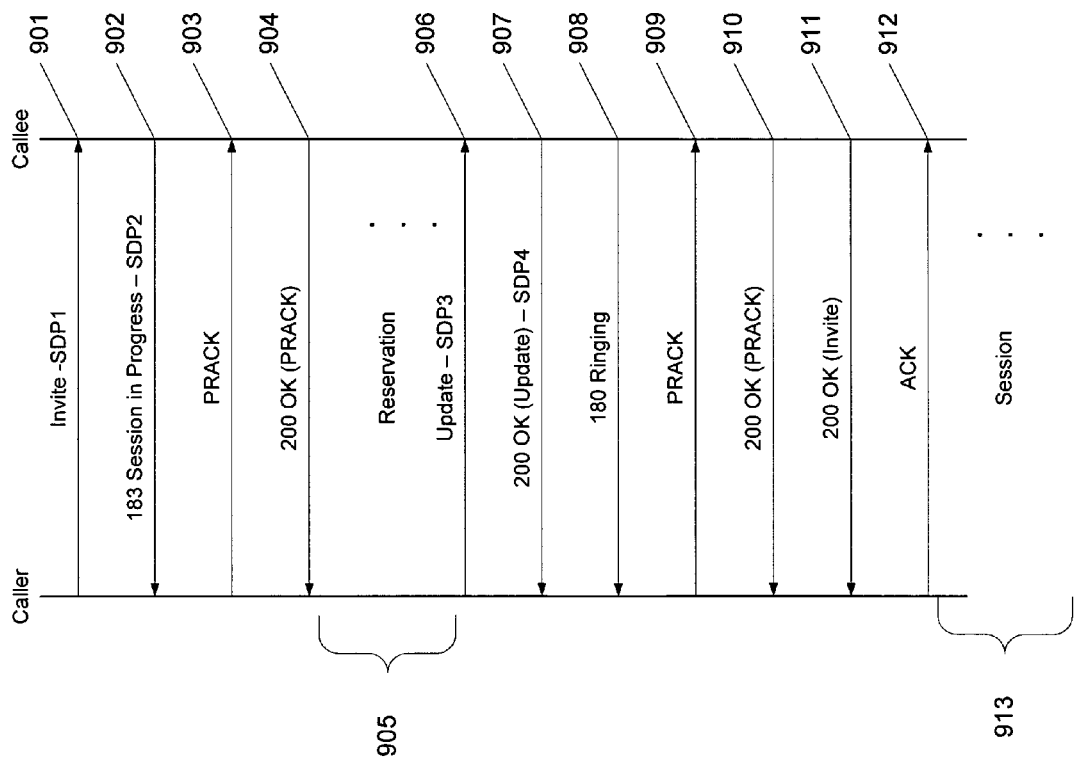
FIG. 9 shows signal exchanges in accordance with aspects of the present invention.

The message flow for setting up a basic session with a resource preconditions (e.g., a phone call) is shown in FIG. 9. Here, a caller from within the coverage area of the antenna is placing a call to a callee outside the coverage area of the antenna.

In step 901, a call starts with an INVITE message from the caller containing an SDP (session description Protocol) PDU (Protocol Data Unit) in the body of the INVITE message. The SDP PDU contains within the body of an INVITE message contains the service requirements of a session. The SDP PDU (shown as SDP1) contains the session media information that informs the callee about the type and requirements of the service(s) that the caller terminal can support.

Next in step 902, the callee responds with a 183 session in progress containing an SDP PDU (shown as SDP2) indicating the capabilities of the callee's terminal.

In steps 903 and 904, after receiving the "183" message, the caller and callee exchange PRACK and OK messages. The acknowledgement messages are followed by a reservation period 905 in which the caller and callee reserve resources by their own means and protocols (e.g., RSVP, etc.).

When the reservation process is complete, the caller sends an UPDATE message 906 containing an SDP PDU (shown as SDP3) that describes the media reservations in the caller to callee direction.

The callee sends a "200" OK message 907 that contains an SDP PDU (shown as SDP4) showing media reservation in the callee to caller direction.

The callee sends a ringing message 908 to the caller to alert the caller that the callee is now ringing.

A pair of acknowledgement signals is exchanged as 909 and 910.

Then callee then indicates the call is connected in 911 and the caller acknowledges in 912 and the session starts. Finally, the caller sends an ACK message to the callee, and the session begins in step 913.

The preceding message flow shows that the SIP Message Processor (SMP) 710 processes the INVITE-SDP1 901, UPDATE-SDP3 906, and 200 OK-SDP4 907, and the final ACK 912 messages of the message flow to obtain information regarding a session and its service. The SIP Message Processor (SMP) 710 may or may not ignore all other call set up messages regarding each call that are copied to it. The SIP Message Processor (SMP) 710 may process the INVITE 901, UPDATE 906, 200 OK 907, and ACK 912 messages of each call as follows:

Upon the reception of each INVITE 901 from the outbound SIP proxy 706, SIP Message Processor (SMP) 710 processes the header of the INVITE message to get the Session-ID, caller's SIP URL and IP address, and creates a temporary data object containing one or more of these data.

Upon receiving an UPDATE message with the same Session-ID from the outbound SIP proxy 706, SIP Message Processor (SMP) 710 obtains the media information from the SDP PDU within the UPDATE body. The SDP PDU media identifies the requirements of this session service in the uplink direction. The SIP Message Processor (SMP) 710 adds this session media (i.e., service requirements) on the uplink to the temporary data object whose Session-ID attribute is identical to the Session ID of the UPDATE message.

Upon reception of the subsequent 200 OK 904 with the same Session-ID, the SIP Message Processor (SMP) 710 obtains the media information from the SDP PDU within the body that specifies the service requirements of the session on the downlink. Then, the SIP Message Processor (SMP) 710 includes this downlink session media information into the temporary data object whose Session ID attribute is the same.

Finally, when the SIP Message Processor (SMP) 710 receives a subsequent ACK with the same Session-ID, it forwards this temporary data object to the database update engine 711.

The database update engine 711 processes the forwarded temporary data and updates the corresponding user data object 801, accordingly. The database update engine 711 receives the temporary data object containing one or more of a URL, an IP address, a Session ID, and uplink and downlink media information. The database update engine 711 sends a message to the resource manager that contains the Session ID as well as the uplink and downlink media information of the session. Depending on the resource management scheme of the network, the resource manager either computes the equivalent capacity and sends it to the database update engine 711, or sends the traffic descriptors of the session's uplink and downlink media to the database update engine 711 to compute the equivalent capacity itself. Then, the database update engine 711 uses the MAC address, URL, and IP address to uniquely identify and update the corresponding user data object in the location database.

The control system and technique may further be applied to other arenas as well. Further, one may standardize code points for the Type and Subtype fields of the announcement MAC_PDUs of a WLAN that ensure proper framing on the uplink of a load equalizing smart antenna. The load equalizing smart antenna may be used with other similar antennas and conventional (non-load-balancing) antennas.

Session Admission Control in Packet Networks

The antenna and control system may control load through selective session admission in packet networks. Session (or call) admission control decides whether to accept or reject a request of setting up a new session in accordance with a network's traffic management policies. Since a network supports different classes of services with distinct capacity needs and QoS requirements, an admission control policy generally attempts to establish fair blocking among the service classes, assure that sufficient network resources are available for each admitted session, and maintain an acceptable utilization level for the overall pool of network resources.

The traffic management of packet (ATM or IP) networks has been studied extensively. Numerous admission control, scheduling, flow control, policing and shaping techniques exist and may function with the antenna load-balancing system described herein. Two approaches are described. These approaches are session admission control using either "equivalent capacity" of a session, or the "admission region" of a node in the network.

Admission Control Using Equivalent Capacity

For admission control using equivalent capacity, the network uses a traffic descriptor of a session and its QoS requirements to estimate the amount of capacity that is required (referred to as equivalent capacity) for supporting the session. Various analytical expressions for derivation of the equivalent capacity have been proposed. The equivalent capacity of a session may be chosen such that, for a given buffer size of X packet per session at the access interface, the packet loss ratio of the session on the access link does not exceed a specified value $\beta$ agreed upon in the service layer agreement of the session. The primary QoS constraint on the performance of real-time services is that packet delay should not exceed an upper bound T. Thus, in order to satisfy it, the maximum buffer size per a real-time session should be $X \leq 0.5\lceil T/\mu \rceil$, where $\mu$ is the mean service (access plus transmission) time of a real-time packet on the frequency channel.

If the peak rate of the traffic on the i-th session is $R_p^{(i)}$, its mean rate $R_a^{(i)}$, and its mean burst length $\delta_i^{-1}$. Assuming that the traffic activity on the i-th session conforms to a two-state Markov chain model, and using the results of Anick et al. (D. Anick, D. Mitra, and M. M. Sondhi, "Stochastic Theory of Data Handling System with Multiple Sources", *Bell System Technical Journal (BSTJ)*, Vol. 61, No. 8, October 1982) with a simple fluid approximation of the session traffic, Guerin, et al. (R. Guerin, H. Ahmadi, and M. Naghshineh, "Equivalent Capacity and Its Application to Bandwidth Allocation in High-Speed Networks", IEEE Journal on Selected Areas of Communications, Vol. 9, No. 7, September 1991) arrives at the following expression for equivalent capacity, $C_1$, of the i-th session:

$$C_i \cong \frac{\alpha \delta_i^{-1}(1-\rho)R_p^{(i)} - X + \sqrt{[X - \alpha \delta_i^{-1}(1-\rho_i)R_p^{(i)}]^2 + 4X\alpha\delta_i^{-1}\rho_i(1-\rho_i)R_p^{(i)}}}{2\alpha\delta_i^{-1}(1-\rho_i)},$$

where $\alpha = -\text{Ln}(\beta)$ and $\rho_i = R_a^{(i)}/R_p^{(i)}$. It is worth noting that as $\rho_i \to 1$, e.g., a voice telephony session, then $C_i \to R_p^{(i)}$, i.e., the equivalent capacity of a constant bit rate session equals its peak rate.

The network admits the request for setting up a session if the free capacity on the access channel (link/medium) exceeds the equivalent capacity of the requested session, i.e., $\Sigma_j C_j \leq C$, where C is the channel capacity. It is worth noting on a multiple access share medium channel such as an 802.11 WLANs, C represents the maximum throughput of the media under "nominal" operation of its MAC protocol.

Admission Control Using Admission Region

For an admission control using admission region approach, the network uses the admission region "maps/curves" as guidelines to decide whether to accept or reject session set-up requests in packet networks. These maps/curves may be stored in the network elements such as switching nodes, smart antenna controllers, or elsewhere or not stored in the network yet access from the network. An admission region is a map/curve whose points represent the number of simultaneous sessions of different services classes that can be supported by the channel or node.

The admission region maps are usually obtained off-line, through measurement, simulation, or analysis, assuming a predetermined number of service classes in the network in the network. This approach may be effective for small networks with limited number of service classes.

For example, in case of an antenna system supporting only voice and best effort data services, one needs to measure (or derive) the admission region of each frequency channel as a function of its beam-width. The admission region is a curve that shows the number of simultaneous voice sessions that a system can support versus the volume of data traffic present in the system. One benefit of using an admission control using an admission region approach is that the admission region reflects the nominal operation of the MAC protocol.

The invention claimed is:

1. A process for equalizing traffic among two or more beams from an array antenna comprising the steps of:
   determining a capacity desired for each one of mobile terminals in an area covered by said two or more beams;
   determining the location of said mobile terminals;
   allocating said two or more beams so that said beams service said terminals; and
   directing a first of said two or more beams to service said terminals, where said directing step includes selecting a position of said first beam from a set of continuous positions,
   where at least one of said beams services a number of terminals whose collective capacity is at least 1/N th of a total capacity desired by the terminals to be serviced by said beams,
   where N is the number of beams,
   where said allocating step allocates said beams among said terminals based on desired capacity of both real-time and non-real-time information, and
   where said allocating step further comprises the steps of:
      separating a time frame into a real-time portion and a non-real time portion;
      allocating said beams during said real-time-portion to handle said real-time information; and
      allocating said beams during said non-real-portion to handle said non-real-time information.

2. The process according to claim 1, said allocating step further comprising the step of:
   adding terminals to a first beam of said two or more beams until a maximum width of said first beam has been reached.

3. The process according to claim 1, said allocating step further comprising the step of:
   adding terminals to a first beam of said two or more beams until the desired capacity of terminals in said first beam meet or exceed 1/Nth of the total capacity desired by the terminals to be serviced by said two or more beams.

4. The process according to claim 1, wherein said allocating step allocates said beams among said terminals based on desired capacity of non-real-time information.

5. The process according to claim 1, wherein said allocating step allocates said beams among said terminals based on desired capacity of real-time information.

6. A system for equalizing traffic among two or more beams from an array antenna comprising the steps of:
- means for determining a capacity desired for each one of mobile terminals in an area covered by said two or more beams;
- means for determining the location of said mobile terminals;
- means for allocating said two or more beams so that said beams service said terminals; and
- means for directing a first of said two or more beams to service said terminals,
- where said means for directing said first of said two or more beams is determined based on a subdivision of time into one or more frames and packet transmission needs of said terminals, and
- where at least one of said beams services a number of terminals whose collective capacity is at least 1/N of a total capacity desired by the terminals to be serviced by said beams,
- where N is the number of beams,
- where said allocating means allocates said beams among said terminals based on desired capacity of both real-time and non-real-time information, and
- where said allocating means further comprises:
  - means for separating a frame into a real-time portion and a non-real time portion;
  - means for allocating said beams during said real-time portion to handle said real-time information; and
  - means for allocating said beams during said non-real portion to handle said non-real-time information.

7. The system according to claim 6, said means for allocating adds terminals to a first beam of said two or more beams until a maximum width of said first beam has been reached.

8. The system according to claim 6, said means for allocating step adds terminals to a first beam of said two or more beams until the desired capacity of terminals in said first beam meet or exceed 1/Nth of the total capacity desired by the terminals to be serviced by said two or more beams.

9. The system according to claim 6, wherein said allocating means allocates said beams among said terminals based on desired capacity of non-real-time information.

10. The system according to claim 6, wherein said allocating means allocates said beams among said terminals based on desired capacity of real-time information.

11. A system for equalizing traffic among beams comprising:
- an antenna having beams that service terminals, each beam being arranged in frames and each beam having two or more active beam widths in each frame;
- a controller that controls said antenna, said controller having
  - a load equalizing engine that allocates said beams based on the location of said terminals and capacity desired by said terminals,
- wherein said controller is further configured to allocate said beams per frame based on output from the load equalizing engine such that a first allocation of a beam in a first portion of the frame is different from a second allocation of the beam in a second portion of the frame based on desired capacity of terminals for both real-time information and non-real-time information, wherein said beams handle said real-time information in the first portion of the frame and said beams handle said non-real-time information in the second portion of the frame,
- where at least one of said beams services a number of terminals whose collective capacity is at least 1/N th of a total capacity desired by the terminals to be serviced by said beams,
- where N is the number of beams,
- where said controller is further configured to allocate said beams based on separating a time frame into a real-time portion and a non-real time portion; allocating said beams during said real-time-portion to handle said real-time information; and allocating said beams during said non-real-portion to handle said non-real-time information.

12. The system according to claim 11, said control further comprising:
- a location database that stores the location of a terminal.

13. The system according to claim 11, said control further comprising:
- a location database that stores the type of service or services of on-going sessions of a terminal.

* * * * *

UNITED STATES PATENT AND TRADEMARK OFFICE
CERTIFICATE OF CORRECTION

PATENT NO. : 8,385,937 B2
APPLICATION NO. : 10/885238
DATED : February 26, 2013
INVENTOR(S) : Vakil et al.

It is certified that error appears in the above-identified patent and that said Letters Patent is hereby corrected as shown below:

On the Title Page

On Page 2, in Item (56), under "OTHER PUBLICATIONS", in Column 1, Line 14, delete "Tge" and insert -- The --, therefor.

In the Specification

In Column 1, Line 35, delete "interchangablely." and insert -- interchangeably. --, therefor.

In Column 5, Line 35, delete "{" and insert -- } --, therefor.

In Column 5, Line 52, delete "(0-π]," and insert -- (0-π), --, therefor.

In Column 9, Line 8, delete "CDMA)" and insert -- CDMA --, therefor.

In Column 12, Lines 40-41, delete "805; and" and insert -- 805; --, therefor.

In Column 12, Line 45, delete "807." and insert -- 807; and --, therefor.

In Column 13, Line 32, delete "=ω$_3$," and insert -- =π/3, --, therefor.

In Column 17, Line 40, delete "C$_1$," and insert -- C$_i$, --, therefor.

In Column 17, Line 44, delete "$\alpha \delta_j^{-1}(1-\rho)R_p^{(i)} - X +$" and insert -- $\alpha \delta_i^{-1}(1-\rho_i)R_p^{(i)} - X +$ --, therefor.

Signed and Sealed this
Second Day of December, 2014

Michelle K. Lee
*Deputy Director of the United States Patent and Trademark Office*